(12) United States Patent
Fausak et al.

(10) Patent No.: US 7,970,563 B2
(45) Date of Patent: Jun. 28, 2011

(54) TESTING APPARATUS AND METHOD FOR SIGNAL STRENGTH OF POWERLINE NETWORKS

(75) Inventors: Andrew T. Fausak, San Jose, CA (US); Ray Liang, Shenzhen (CN)

(73) Assignee: Asoka USA Corporation, Santa Clara, CA (US)

( * ) Notice: Subject to any disclaimer, the term of this patent is extended or adjusted under 35 U.S.C. 154(b) by 398 days.

(21) Appl. No.: 12/123,416

(22) Filed: May 19, 2008

(65) Prior Publication Data

US 2009/0287432 A1 Nov. 19, 2009

(51) Int. Cl.
*G01R 21/00* (2006.01)
*G01R 21/06* (2006.01)

(52) U.S. Cl. .......................................... 702/60; 702/61
(58) Field of Classification Search ...................... 702/60
See application file for complete search history.

(56) References Cited

U.S. PATENT DOCUMENTS

| | | | | |
|---|---|---|---|---|
| 5,491,463 A | * | 2/1996 | Sargeant et al. | 340/310.16 |
| 5,812,557 A | * | 9/1998 | Stewart et al. | 714/712 |
| 7,461,174 B2 | * | 12/2008 | Chan et al. | 709/250 |
| 7,813,099 B2 | * | 10/2010 | Chan | 361/119 |
| 2002/0039026 A1 | | 4/2002 | Stroth | |
| 2002/0039388 A1 | | 4/2002 | Smart | |
| 2007/0082649 A1 | | 4/2007 | Chan | |
| 2007/0159981 A1 | | 7/2007 | Chang | |
| 2009/0219824 A1 | * | 9/2009 | Kozlowski et al. | 370/250 |
| 2009/0273334 A1 | * | 11/2009 | Holovacs et al. | 324/66 |

OTHER PUBLICATIONS

International Search Report and Written Opinion for PCT/US2009/044543, Jan. 21, 2010.

* cited by examiner

*Primary Examiner* — Michael P Nghiem
(74) *Attorney, Agent, or Firm* — Baker Botts L.L.P.

(57) ABSTRACT

A powerline signal test apparatus has a housing, a pair of prongs protruding from the housing, a powerline module coupled to the pair of prongs within an interior region of the housing. The powerline module is configured to process a first data signal in a first format. The apparatus further has a processor coupled to the powerline module. The processor is configured to initiate transfer of first test data characterized by a first data rate from the pair of prongs through a portion of a powerline network to a target node and initiate receipt of second test data characterized by a second data rate. Moreover, the apparatus has a signal strength indication for the portion of the powerline network associated with the second test data characterized by the second data rate. Furthermore, the apparatus has an output device coupled to the housing and configured to output the signal strength indication.

20 Claims, 20 Drawing Sheets

PNT Settings

Testing from host to PNT Device

MAC Address | Device Name
☑ 00:13:C1:00:CE:E8 | DevicehaAG8U
☐ 00:13:C1:00:CF:25 | DevicehaAG9s
☐ 00:13:C1:00:CF:24 | DevicehaAG9S

[Select All]
[Deselect All]

Testing from end to end

Source PNT Devices

[Add Source]
[Add Dest]

Pairs of PNT Devices for testing

Source PTD          Destination PTD
00:13:C1:00:CF...   00:13:C1:00:C...

[Remove]
☑ Simultaneously

[Next]  [Cancel]

FIG. 6B

| DA | SA | Type | DeviceType | Cmd | Length | Data | CheckSum |
|---|---|---|---|---|---|---|---|

DA:  Destination MAC Address, 6 Bytes

SA:  Source MAC Address, 6 Bytes

Type:  Type of Ethernet packet, 2 Bytes (DA, SA and Type form the header of Layer2 packet)

Device Type:  Device Type, 1 Byte

100: Unknown

101: PL9550-WAP

102: PL9950-BBR

103: PTD-200M

104: PTD-85M

Cmd:  Type of message, 2 Bytes

Length:  Length of Data field, 2 Bytes

Data:  Content of message

CheckSum:  Check Sum for Data filed, 4 Bytes

```
UINT32   i;
UINT32 n_value;
UINT32 chksum = 0xffffffff;
if(nLength>=4)
{
    for(i=0;i<nLength;)
    {
        n_value = *(unsigned int*)(pData+i);
        chksum = chksum ^n_value;
        i = i+4;
    }
}
```

FIG. 7A

Cmd: 101

| FF:FF:FF:FF:FF:FF | SA | 0x9011 | 103/104 | 101 | Length | Data Null | CheckSum |

Length: 0

FIG. 7B

Cmd: 102

| DA | SA | 0x9011 | 103/104 | 102 | Length | PTD Information | CheckSum |

Length: 80

The details of PTD information:

| PLC MAC Address | IP Address | LED Threshold | PLC MAC Version | PTD Version | Revision |

PTD PLC MAC Address: 6 Bytes

PTD IP Address: 4 Bytes

PTD LED Threshold: 3 Bytes

PLC MAC Version: 45 Bytes

PTD Version: 2 Bytes, 1 byte.1byte, for example: 0106 = 1.06

PTD name: 16 Bytes

Revision: 4 Bytes, fill full with 0x00

FIG. 7C

Cmd: 103

| DA | SA | 0x9011 | 103/104 | 103 | Length | IP Address | CheckSum |

Length: 4

IP Address: 4 bytes

Cmd: 104

| DA | SA | 0x9011 | 103/104 | 104 | Length | Start Test Status | CheckSum |

Length: 1

Start Test Status:

101: Success

102: Fail

FIG. 7D

Cmd: 120

| DA | SA | 0x9011 | 103/104 | 120 | Length | Data Null | CheckSum |

Length: 0

Cmd: 121

| DA | SA | 0x9011 | 103/104 | 121 | Length | Stop Test Status | CheckSum |

Length: 1

Stop Test Status:

101: Success

102: Fail

FIG. 7E

Cmd: 130

| DA | SA | 0x9011 | 103/104 | 130 | Length | Param | CheckSum |

Length: 20

Param: 20 bytes

Destination MAC: 6 bytes

Destination IP: 4 bytes

Packet size: 2 bytes, unit is Byte

Test Type: 3 bytes

| 1 | 2 | 3 |
|---|---|---|
| PING | TCP | UDP |

Value = 0, Disable test

Value > 0, Test Amount

TCPWindows size: 1 bytes, unit is N*8KB;

UDPWindows size: 1 bytes, unit is N*8KB;

UDP bandwidth: 1 bytes, unit is MB

Revision: 2 Bytes, fill full with 0x00

Cmd: 131

| DA | SA | 0x9011 | 103/104 | 131 | Length | Test Status | CheckSum |

Length: 1

Test Status: 1 byte

101: Success

102: Fail

FIG. 7F

Cmd: 132

| DA | SA | 0x9011 | 103/104 | 132 | Length | Report Information | CheckSum |

Length: variable

Report Information: 1298 bytes

SRC MAC: 6 bytes

DEST MAC: 6 bytes

SendPackets: 1 Bytes

ReceivePackets: 1 Bytes

LostPackets: 1 Bytes

Max RTT: 1 Bytes

Min RTT: 1 Bytes

Average RTT: 1 Bytes

TCP Amount: 1 Bytes, Max are 128

TCP Report structure: 2 bytes * TCP Amount, Max are 128 reports.

TCP Up Rate/Down Rate: 2 Bytes, 1Bytes.1Bytes, each bytes value is from 0 to 99;

UDP Amount: 1 Bytes, Max are 128

Test Report: 8 * UDP Amount, each report is 8 bytes, Max are 128 reports.

UDP Bandwidth: 2 Bytes, 1Bytes.1Bytes

UDP jitter: 2 Bytes (1000uS)

Packets: 2 Bytes

Lost Packets: 2 Bytes

Cmd: 133

| DA | SA | 0x9011 | 103/104 | 133 | Length | Status | CheckSum |

Length: 1

Status: 1 byte

101: Success

102: Fail

FIG. 7G

Cmd: 105

| DA | SA | 0x9011 | 103/104 | 105 | Length | Data Null | CheckSum |
|----|----|--------|---------|-----|--------|-----------|----------|

Length: 0

Cmd: 106

| DA | SA | 0x9011 | 103/104 | 106 | Length | Testing Status | CheckSum |
|----|----|--------|---------|-----|--------|----------------|----------|

Length: 1

Testing Status:

100: Not Start

101: In Process

102: Fail

103: Success

FIG. 7H

Cmd:107

| DA | SA | 0x9011 | 103/104 | 107 | Length | Attribute | CheckSum |
|----|----|--------|---------|-----|--------|-----------|----------|

Length: 20

Attribute:

PTD name: 16 Bytes

Thresholds: 3 Bytes

Revision: 1 Bytes = 0x00

Cmd: 108

| DA | SA | 0x9011 | 103/104 | 108 | Length | Status | CheckSum |
|----|----|--------|---------|-----|--------|--------|----------|

Length: 1

Thresholds: 1 Bytes

101: Success

102: Fail

FIG. 7I

Cmd: 109

| DA | SA | 0x9011 | 103/104 | 109 | Length | Data Null | CheckSum |

Length: 0

Cmd: 110 with length 1:

| DA | SA | 0x9011 | 103/104 | 110 | Length | Status | CheckSum |

Length: 1

Status: 1 Bytes

101: Success

102: Fail

FIG. 7J

TESTING APPARATUS AND METHOD FOR SIGNAL STRENGTH OF POWERLINE NETWORKS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

COPYRIGHT NOTICE

Certain portions of the present specification include computer codes and instructions, where notice is hereby given. All rights have been reserved under Copyright by Asoka USA Corporation, which is the present assignee. Copyright©2007 and 2008 Asoka USA Corporation.

BACKGROUND OF THE INVENTION

The present invention relates generally to power line networking techniques. More particularly, the invention provides an apparatus for testing a signal strength of a high speed power line network using a testing method and apparatus. Merely by way of example, the invention has been applied in a local area network environment, but it would be recognized that other applications exist. The invention can also be applied to building area networking, home networking, office networking, apartments, any combination of these, and other networking applications.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Powerline Communication, commonly called PLC. Powerline communication relies upon pre-existing power lines that are used to supply electrical power distributed through buildings, such as homes and office structures. Conventional PLC relies upon radio frequency technologies. Although power line communications have been successful in part, many limitations still exist.

For example, the newly developed powerline communication generally has not yet been "mainstream." and has limited capability due to lack of infrastructure. Additionally, powerline network devices are lacking and simply do not exist on a wide scale. In conventional office settings in the United States, powerline networking is usually absent and almost non-existent due to many integration difficulties in a home or office network environment. Additionally, once implemented, powerline networks may be often difficult to test and diagnose from limited powerline utility tools.

From the above, it is seen that improved techniques for powerline networks are highly desired.

BRIEF SUMMARY OF THE INVENTION

According to the present invention, techniques for powerline networking are provided. More particularly, the invention provides an apparatus for testing a signal strength of a high speed power line network using a testing method and apparatus. Merely by way of example, the invention has been applied in a local area network environment, but it would be recognized that other applications exist. The invention can also be applied to building area networking, home networking, office networking, apartments, any combination of these, and other networking applications.

In a specific embodiment, the present invention provides a powerline signal test apparatus, which may be standalone or integrated into a network device. The apparatus has a housing, e.g., plastic, metal. The apparatus has a pair of prongs protruding from the housing. In a preferred embodiment, the pair of prongs include a first prong and a second prong to be inserted respectively into an AC powerline outlet. The apparatus has a powerline module coupled to the pair of prongs and within an interior region of the housing. In a specific embodiment, the powerline module is configured to process a first data signal in a first format. The apparatus has a processor (e.g., microprocessor, micro-controller, network processor) coupled to the powerline module and provided within the interior region of the housing. The processor is configured to initiate transfer of first test data characterized by a first data rate from the pair of prongs through a portion of a powerline network to a target node. In a specific embodiment, the processor is configured to initiate receipt of second test data characterized by a second data rate. The apparatus has a signal strength indication for the portion of the powerline network associated with the second test data characterized by the second data rate. The apparatus has an output device coupled to the housing. The output device is configured to output the signal strength indication.

In an alternative specific embodiment, the present invention provides a method for determining signal strength of a powerline network. The method includes providing a powerline test apparatus, which can be similar to the one noted, but can be others. The test apparatus comprising a housing, a pair of prongs protruding from the housing, a powerline module coupled to the pair of prongs and within an interior region of the housing, a processor coupled to the powerline module and provided within the interior region of the housing, a signal strength indication, and an output device configured to output the signal strength indication. The method includes inserting the pair of prongs into a power outlet coupled to a segment of a powerline network, which is coupled to a powerline data source. The method includes transferring a first test data characterized by first data rate through the pair of prongs. The method includes receiving one or more portions of the first test data at the target node through the portion of the powerline network. The method also includes processing one or more portions of the first test data to derive the second test data and deriving the signal strength indication for the portion of the powerline network associated with the second test data characterized by the second data rate. The method includes outputting the signal strength indication using the output device.

One or more benefits can be achieved using the present invention over conventional techniques. The present invention can be applied using conventional components from computer networking and hardware technologies. Additionally, the invention can be applied to pre-existing power line structures without substantial modification. Preferably, the present system and method are easy to implement and also allows for power line networking capabilities and power plug abilities using the same apparatus according to a specific embodiment. In a preferred embodiment, the powerline network can be easily tested using the present testing method and apparatus in a non-intrusive manner. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 6A-6F are exemplary screen displays of a GUI interface of a performance network tester software utility according to an embodiment of the present invention;

FIG. 7A is an exemplary protocol command format according to an embodiment of the present invention;

FIGS. 7B-7J are diagrams illustrating corresponding command details according to certain embodiments of the present invention.

DETAILED DESCRIPTION OF THE INVENTION

According to the present invention, techniques for powerline networking are provided. More particularly, the invention provides an apparatus for testing a signal strength of a high speed powerline network using a testing method and apparatus. Merely by way of example, the invention has been applied in a local area network environment, but it would be recognized that other applications exist. The invention can also be applied to building area networking, home networking, office networking, apartments, any combination of these, and other networking applications.

To make installation and troubleshooting easier on PLC networking, a kind of tool to detect end-to-end powerline signal strength, Transfer Control Protocol/User Datagram Protocol (TCP/UPD) throughput, etc., described is developed according to certain embodiments of the present invention. In particular, the tool is called PNT (Performance Network Tester) including a powerline test apparatus called PNT Device (PTD) for rolling back data traffic, a testing host device called Test Host Adaptor (THA) used to connecting a computer for testing, and a Graphical User Interface (GUI)-based PNT software utility running on the computer. The powerline test apparatus PTD is a kind of PLC smart bridge which has embedded agent and server for traffic download/upload. For example, the PTD can be made using hardware platform like PlugLAN™ SmartBridge product (including PL8060-ETH and PL8050-ETH) provided by Asoka Corporation at Santa Clara, Calif. The testing host device THA is a PLC AV/Turbo adaptor which can be hooked to any of PLC nodes to serve as a host node for connecting testing host computer running a PNT software utility. It is understood that the examples and embodiments described herein are for illustrative purposes only and that various modifications or changes in light thereof will be suggested to persons skilled in the art and are to be included within the spirit and purview of this application and scope of the appended claims.

Figure 1A:
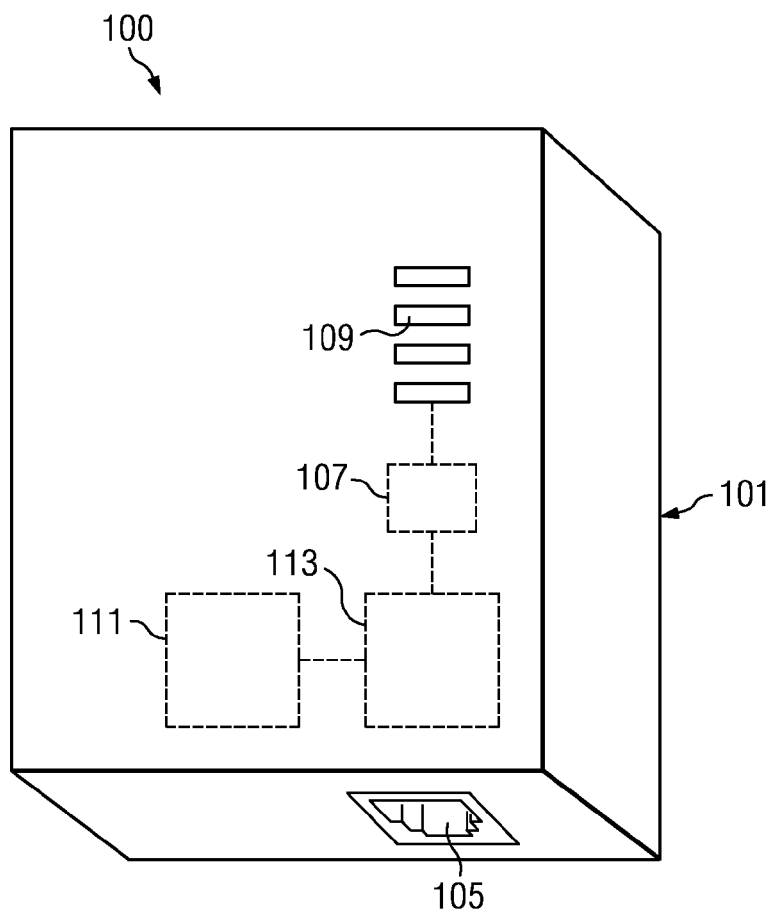
FIG. 1 (including FIGS. 1A and 1B) is a simplified diagram of a powerline test apparatus according to an embodiment of the present invention.
Figure 1B:
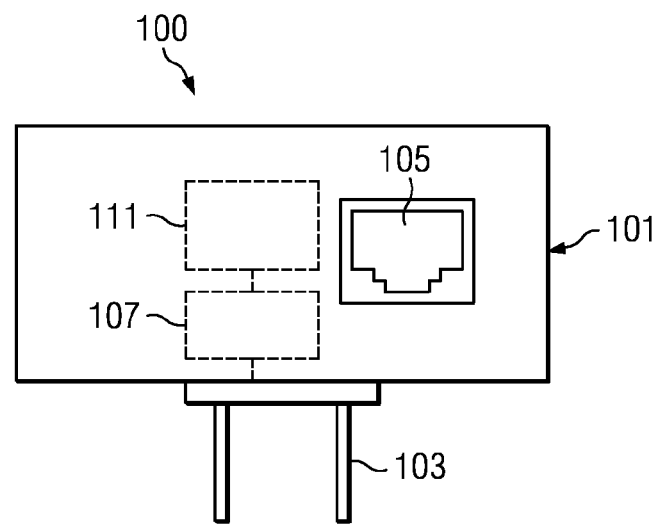

FIG. 1 (including FIGS. 1A and 1B) is a simplified diagram of a powerline test apparatus according to an embodiment of the present invention. This diagram is merely an example, which should not unduly limit the scope of the claims. One of ordinary skill in the art would recognize many variations, modifications, and alternatives. As shown, the powerline test apparatus 100, which is an exemplary PTD, has a housing 101 made of a suitable material such as molded plastic, metal, or any combination of these materials and configured to be a box-like shape, including six sides (although other designs or materials can also be used). For example, the housing has a width of less than six inches and a length of less than ten inches. In a specific embodiment, the housing 101 includes at least a pair of prongs 103 on the bottom side (viewable in the side view illustrated in FIG. 1B). The housing 101 is removable and can be used to insert into one of a plurality of powerline outlets via the pair of prongs 103 according to a specific embodiment. Alternatively, a power extension cable may be used to connect one powerline outlet to a socket (not shown) on the housing. The housing 101 also has at least one output port 105 on one side as a local area network (LAN) port, which can be either Ethernet, USB, or other communication port. The housing 101 further includes one or more visual displays 109 on the top side according to a specific embodiment. The visual displays 109 can be a liquid crystal display (LCD), a plurality of LEDs, or other display indications. The visual displays 109 are for signifying corresponding signal strength regarding to power, Homeplug Activity, Ethernet Link, and test status of a segment of powerline network being under test. Of course, there can be other variations, modifications, and alternatives. In one embodiment, there is a powerline module 107 within (i.e., inside) the housing 101. In one embodiment, the powerline module 107 is coupled to the pair of prongs 103. In one embodiment, the powerline module 107 is also coupled to the visual displays 109 via a driver 113 positioned between the powerline module 107 and the visual displays 109. In one embodiment, the driver 113 is within (i.e., inside) the housing 101. In one embodiment, there is a processor 111 within (i.e., inside) the housing 101. In one embodiment, the processor 111 is coupled to the powerline module 107.

Figure 2A:
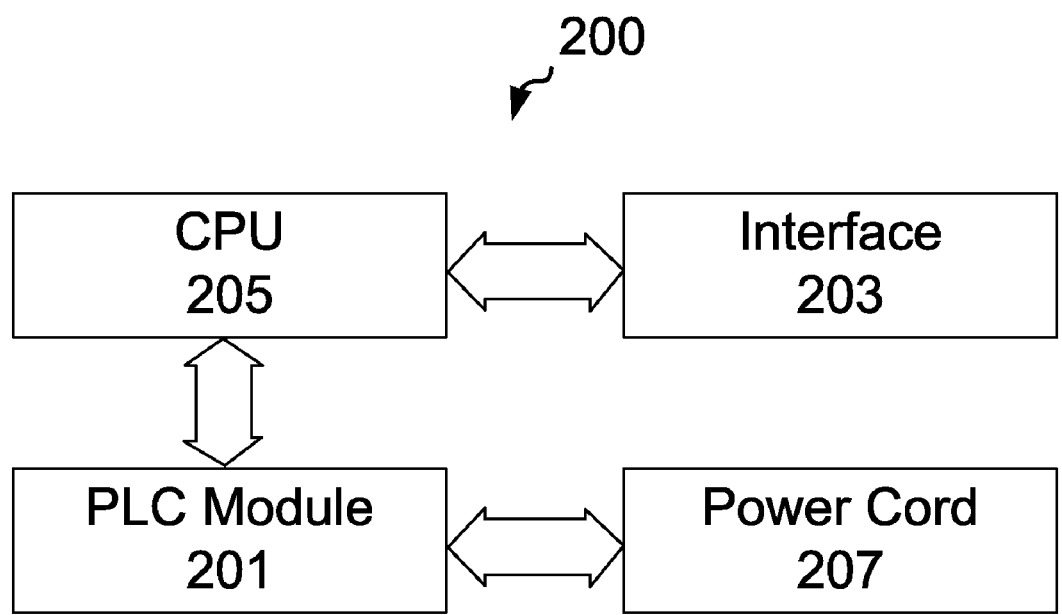
FIG. 2A is a simplified diagram illustrating a hardware architecture of a powerline test apparatus according to an embodiment of the present invention.

FIG. 2A is a simplified diagram illustrating a hardware architecture of a powerline test apparatus according to an embodiment of the present invention. This diagram is merely an example, which should not unduly limit the scope of the claims. One of ordinary skill in the art would recognize many variations, modifications, and alternatives. As shown, the powerline test apparatus 200 includes at least the following functional parts: a PLC module 201, a microprocessor 205, a power cord 207, and a network interface 203. For example, the powerline test apparatus 200 is a PTD. The PLC module 201 is configured to receive both power and test data from the power cord 207 (which is plugged into one of power outlets in a section of powerline network. The PLC module 201 further is configured to process test data through the microprocessor 205 and output to a user through the network interface 203.

Figure 2B:
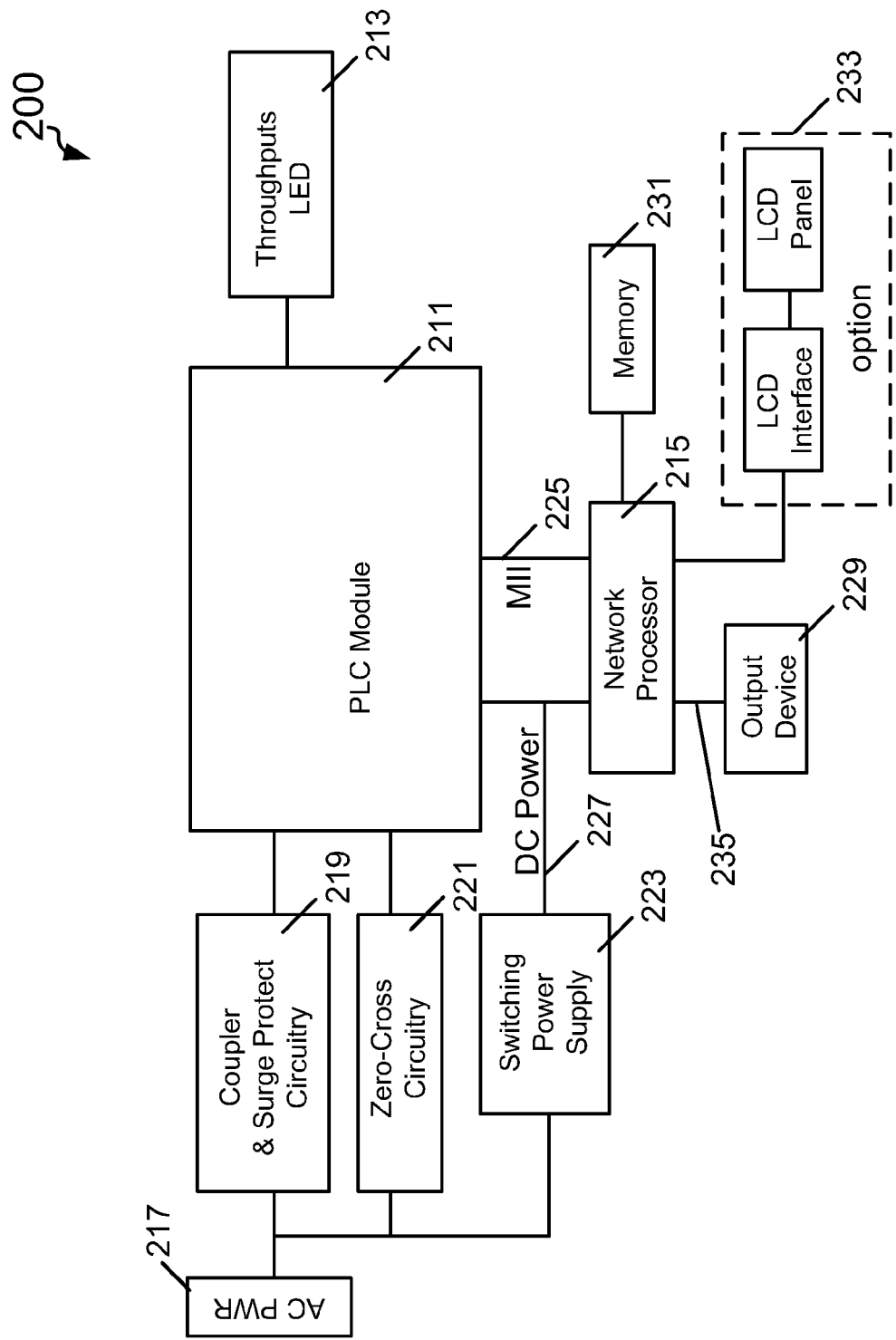
FIG. 2B is a detail functional diagram of a powerline test apparatus according to an embodiment of the present invention.

FIG. 2B is a detail functional diagram of a powerline test apparatus according to an embodiment of the present invention. This diagram is merely an example, which should not unduly limit the scope of the claims. One of ordinary skill in the art would recognize many variations, modifications, and alternatives. In a specific embodiment, the powerline test apparatus 200 is a PTD either as a standalone device or part of an integrated network device. As shown, AC power 217 is coupled, through the pair of prongs or proper adapted power cord, to a coupler and surge protection circuitry 219, which is coupled to a powerline module 211. In a specific embodiment, the AC power 217 is also coupled to a zero-cross circuitry 221, which is independently coupled to the powerline module 211. The AC power 217 also is supplied to a switching power supply 223, which is isolated from the input/output of the powerline module 211. The switching power supply 223 provides a clean source of DC power to the powerline module 211 and a network processor 215, as shown, through a connection 227.

In a specific embodiment, the powerline module 211 is configured to handle a first data signal in a first format. In one embodiment, this first data signal provides first test data. As further shown, the powerline module 211 is coupled to the network processor 215 (e.g., microprocessor, micro-controller, network processor) to process the first data signal, which can be provided within the interior region of the housing. For example, the processor 215 has a 32 bits CPU power for data processing. The processor 215 further is configured to execute a software utility module embedded within the PLC module to initiate a transfer of one or more test data, including the first data signal characterized by a first data rate through a portion of a powerline network to one of target nodes. In one example the first data signal includes at least TCP, UDP or other traffic for network device identification and communication characterization. In another example, the first data rate is at least 14 MB per second, 85 MB per second, 200 MB per second, 400 MB per second, or 1000 MB per second. In a specific embodiment, at said one of target nodes a peer powerline test apparatus can be plugged in there, which is substantially the same as powerline test apparatus 211 and configured to initiate an acknowledge traffic of one or more test data. The acknowledge traffic includes at least a second data signal characterized by a second data rate that can be used for a user to obtain information about end-to-end IP throughput, UDP packet lost or network jitter. In one embodiment, the second data rate is less than the first data rate. In one embodiment, this second data signal provides second test data. In one embodiment, the second test data may be derived from processing the first test data. More detail about the test data traffic will be described through out the present specification and particularly below.

In one specific embodiment, the powerline test apparatus 200 is configured to provide a signal strength indication associated with the second data signal characterized by the second data rate for a portion of the powerline network. As an example, the signal strength indication is shown to be displayed by a plurality of LEDs 213, which are directly coupled to the powerline module 211. Alternatively, there may be other types of display devices including LCDs and combinations of different types as means of displaying the signal strength indication. Of course, there can be other variations, modifications, and alternatives.

In another specific embodiment, the powerline test apparatus 200 has an output device 229 coupled to a data port 235 of the processor 215 within the housing. The output device 229 is configured to output the signal strength indication, among other information. In a specific embodiment, the output device 229 can be adapted to mate the data port 231 via an 10/100 network RJ-45 connector or others. In a specific embodiment, the network processor 215 is coupled via another port 225 connecting to the powerline device 211 using a MII communication format. In a specific embodiment, the network processor 215 can also include a Memory 231, an interface for an LCD panel or LCD interface 233. Test results and associated information can be obtained either at least partially through the LCD panel 233 or through the output device 229. Of course, there can be other variations, modifications, and alternatives.

Figure 2C:
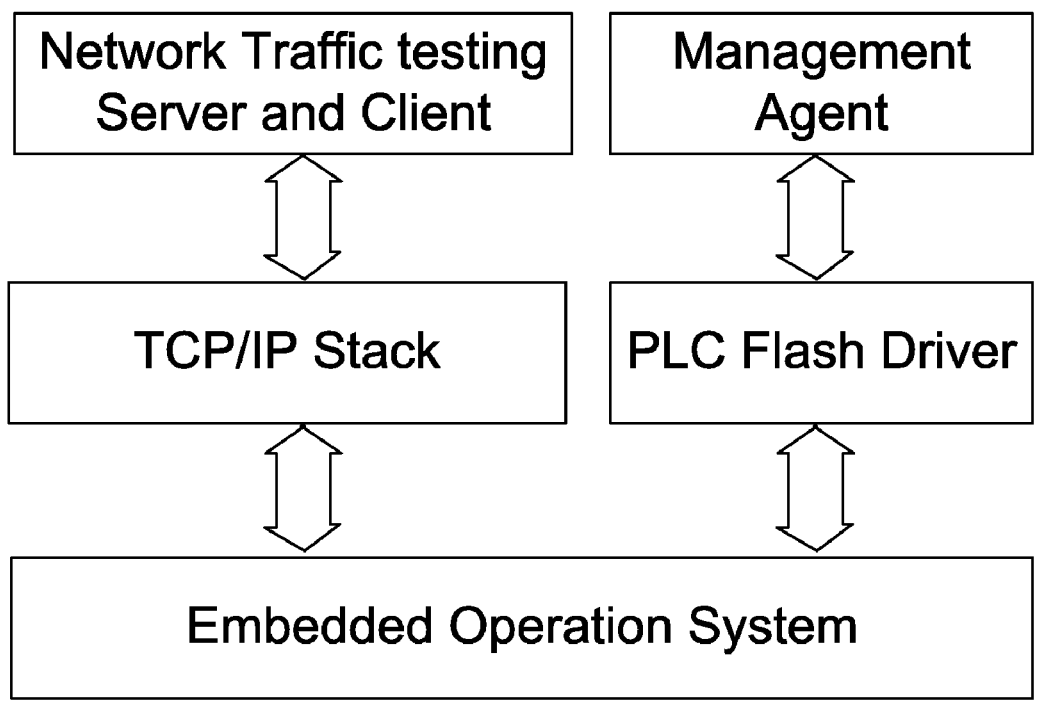
FIG. 2C is a simplified block diagram showing a software utility module embedded in the powerline test apparatus according to an embodiment of the present invention.

FIG. 2C is a simplified block diagram showing a software utility module embedded in the powerline test apparatus according to an embodiment of the present invention. This diagram is merely an example, which should not unduly limit the scope of the claims. One of ordinary skill in the art would recognize many variations, modifications, and alternatives. As shown, the software utility module is a firmware loaded within the powerline test apparatus running on an embedded operation system. In particular, the embedded operation system can be based on open source Linux Operation System. For example, in the PTD mentioned earlier the embedded operation system can be based on a Realtek platform or an Infineon platform. The embedded operation system is configured to control TCP/IP stack and instruct transferring of test data between testing server and client through the portion of the powerline network. Additionally, the embedded operation system is capable of using a Management Agent, through a PLC Layer2 Driver, to deal with private management protocol during communication between the powerline test apparatus and a diagnostic software loaded in test host computer. More detail about the working flow of the software utility module will be described through out the present specification and particularly below.

Figure 2D:
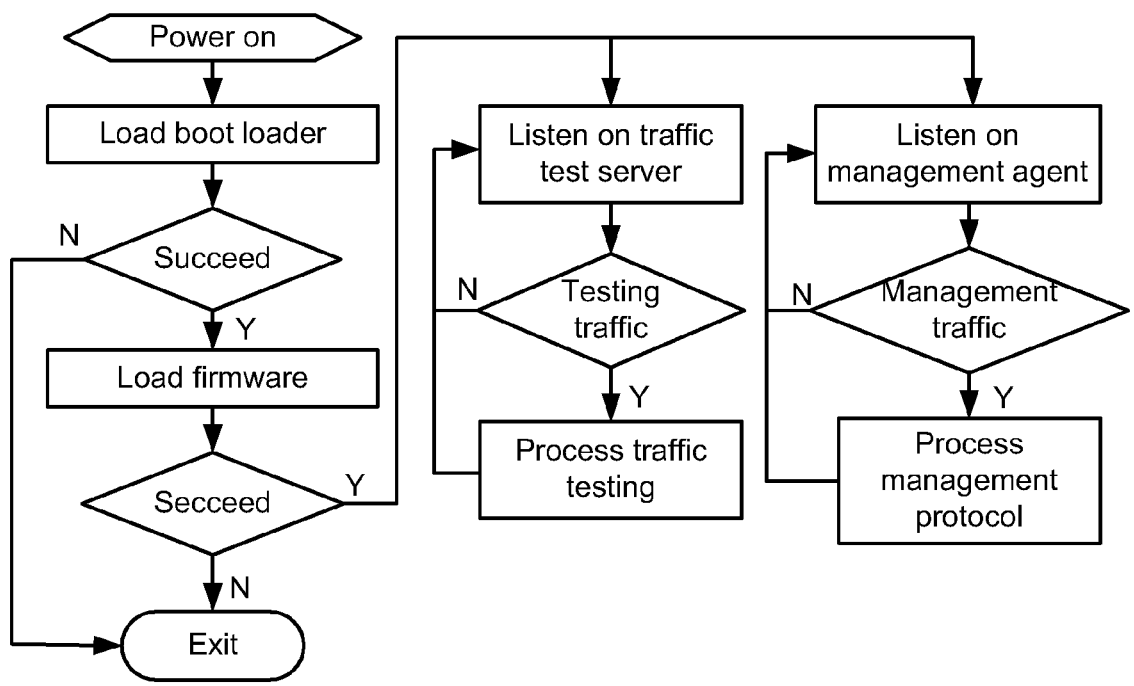
FIG. 2D is a simplified diagram of a working flowchart of the software utility module according to an embodiment of the present invention.

FIG. 2D is a simplified diagram of a working flowchart of the software utility module according to an embodiment of the present invention. This diagram is merely an example, which should not unduly limit the scope of the claims. One of ordinary skill in the art would recognize many variations, modifications, and alternatives. As pointed earlier, the software utility module is a firmware embedded within the powerline test apparatus. In particular, the software utility module is preloaded into a flash memory of PTD hardware for dealing with test commands sent from the test host and committing the powerline network testing through data transfer and reception; calculation of TCP throughput, UPD packet lost and jitter; test results report, etc. As shown in this working flowchart, when a PTD is powered on, a boot loader is loaded. Once the boot loader succeeds, the firmware loading starts. After the firmware is successfully loaded into RAM, it then can be used for instruct the PTD to listen on traffic test server or to listen on management agent. If a testing traffic is identified, the PTD is instructed to initiate its testing process. If a management message is identified, then the PTD is triggered to process management protocol.

Figure 3:
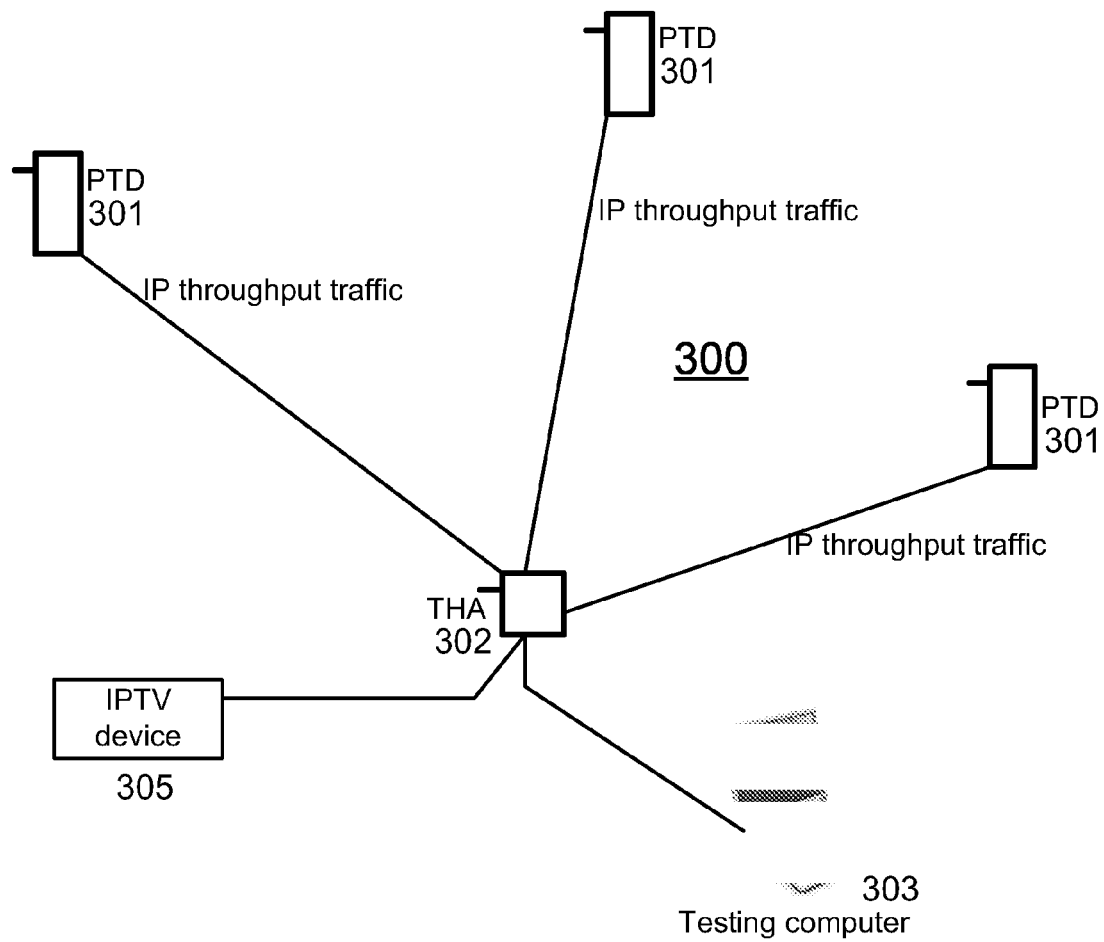
FIG. 3 is a simplified diagram illustrating a powerline performance testing configuration according to an embodiment of the present invention.

FIG. 3 is a simplified diagram illustrating a powerline performance testing configuration according to an embodiment of the present invention. This diagram is merely an example, which should not unduly limit the scope of the claims. One of ordinary skill in the art would recognize many variations, modifications, and alternatives. As shown, a powerline network 300 includes a plurality of network nodes. Each of a plurality of network nodes includes at least one powerline network outlet which can be plugged in a powerline test apparatus 301, correspondingly being referred as a testing node. In one example, each of these powerline test apparatus 301 is a powerline test apparatus 100 or 200 or simply a PTD to roll back testing traffic from the corresponding test node. In a specific embodiment, one specific node of the plurality of network nodes other than those test nodes is chosen to be a host to plug-in a test host adaptor (THA) 302. THA 302 is testing host device for connecting a host computer 303 to the network 300. The host computer 303 is configured to run at least one PNT software utility for conducting powerline network testing according to embodiments of the invention. For example, the PNT software utility is a GUI-based diagnostic software module that is developed under Microsoft Visual C++ environment. The computer 303 can be, but not limited to, a laptop computer, server, personal computer, or other computing device with Microsoft Window OS. Additionally, in this powerline network the THA 302 can also be used to deliver audio and video signals to one or more IPTV devices 305 including game consoles, Slingbox™ devices, TIVO® or other digital video recorders (DVRs), set-top boxes, and network attached storage (NAS) separately or simultaneously for IPTV applications. For example, the THA 302 can be PL9660-ETH PlugLink® AV 9660 Ethernet Adapter provided by Asoka Corporation at Santa Clara, Calif. Details about a testing method based on such a powerline performance testing configuration will be described particularly below.

Figure 4:
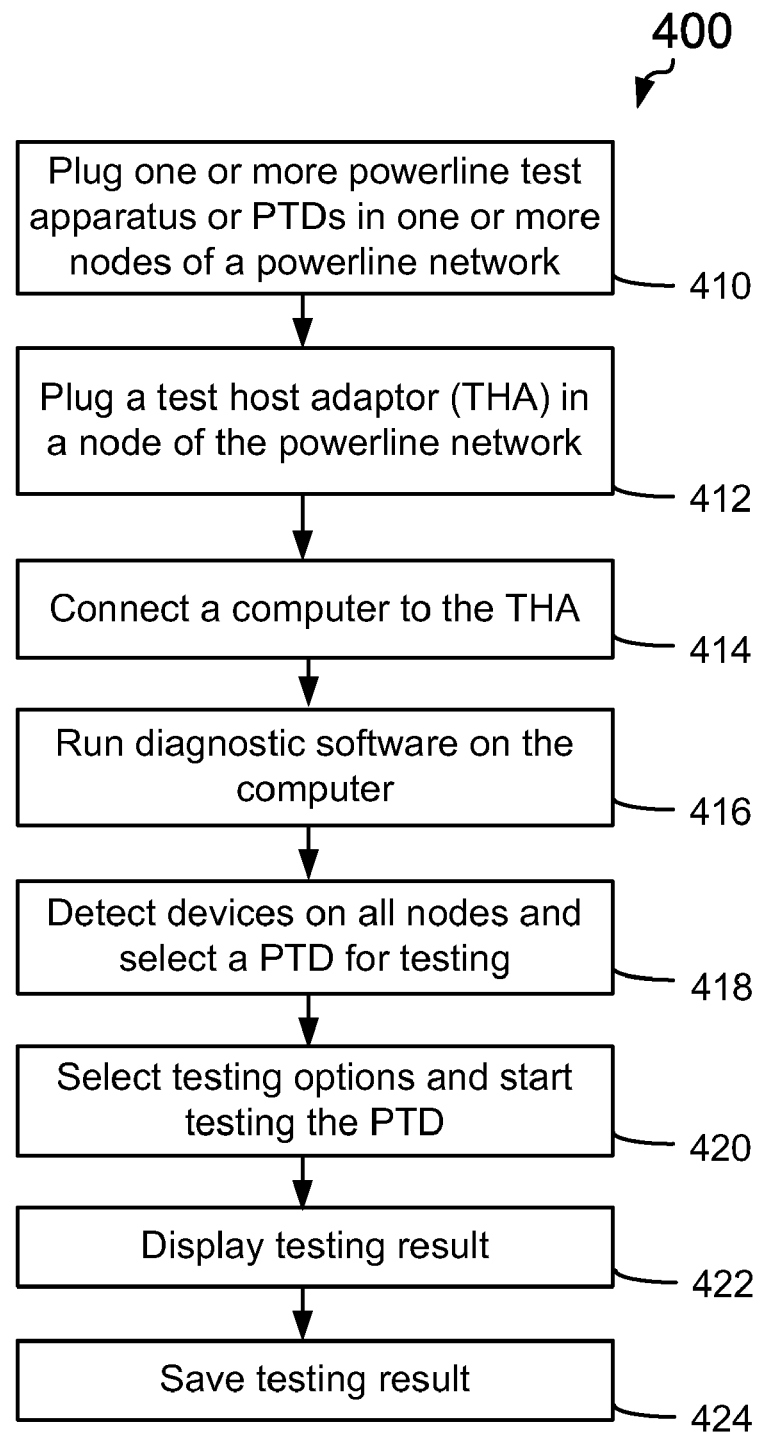
FIG. 4 is a simplified diagram of a test method according to an embodiment of the present invention.

FIG. 4 is a simplified diagram of a test method according to an embodiment of the present invention. This diagram is merely an example, which should not unduly limit the scope of the claims. One of ordinary skill in the art would recognize many variations, modifications, and alternatives. As shown, the testing method 400 includes a step 410 of plugging one or more powerline test apparatus in one or more powerline network nodes. Each powerline network node includes at least one powerline outlet. The one or more powerline network nodes belong to a portion of a powerline network. For example, the portion of a powerline network belongs to powerline network 300. Each of the one or more powerline test apparatus is a powerline test apparatus 301 or a PTD described earlier. In some nodes non-PTD devices such as any other commercial or industrial or household electrical devices may be plugged in. The plugging of the PTDs can be performed by simply inserting a pair of prongs into a powerline outlet or an AC power receptacle.

In one embodiment, the plugged-in PTD has been configured, for example based on block diagram shown FIG. 2B for the powerline test apparatus 200, to communicate with a test server controlled by a user (or test host). Further, the testing method 400 includes a step 412 of plugging one test host adaptor THA in one node of the portion of the powerline network. For example, the test host adaptor is a THA 302 of FIG. 3 which can be a PLC AV/Turbo adaptor, e.g., a PL9660-ETH PlugLink® AV 9660 Ethernet Adapter provided by Asoka Corporation at Santa Clara, Calif. The test node with THA is called test host node. Then a step 414 of the testing method 400 includes connecting a computer to the THA through an Ethernet cable. The computer has preloaded a diagnostic software configured to conduct network testing between the PTDs and the THA. In one example, the diagnostic software is a PNT software utility designed for powerline network testing.

The testing method 400 further includes a step 416 running the diagnostic software on the host computer. For example, the PNT software utility includes a PING tool along with Microsoft Windows OS to get network response time between any two nodes. The testing method 400 then includes detecting devices on all nodes and selecting a PTD (step 418) for testing, and additionally selecting testing options and starting testing (step 420). For example, the PNT software utility uses PING tool to get network response time between the host node with the THA and the testing node with the selected PTD. When the PNT software utility starts running, test client in the software will generate TCP and UDP traffic to the PTD, the PTD will respond to these traffic with corresponding acknowledge traffic. Then a special arithmetic built in the software is used to calculate end-to-end IP throughput, UDP packet loss and network jitter. Of course, many other testing results or information associated with the powerline network performance and characteristics can be obtained. Furthermore, the testing method 400 includes displaying testing result (step 422) and saving the result (step 424).

The above sequence of steps provides a summary of a testing method according to an embodiment of the present invention. Other alternative steps can also be provided where one or more steps are added, one or more steps may be removed, or one or more processes are provided in a different sequence without departing from the scope of the claims herein. For example, if an error occurs, the PNT software utility may determine not to display the testing results instead to move on testing next pair of nodes. In another example, after testing results for the selected PTD is displayed, another step can be included to determine if or one or more different (host-PTD) node-pairs need to be tested. Through this step, a series of testing can be conducted one by one for many node-pairs. More details of the testing method according to certain embodiments of the present invention can be found below in an exemplary software working flowchart.

Figure 5:
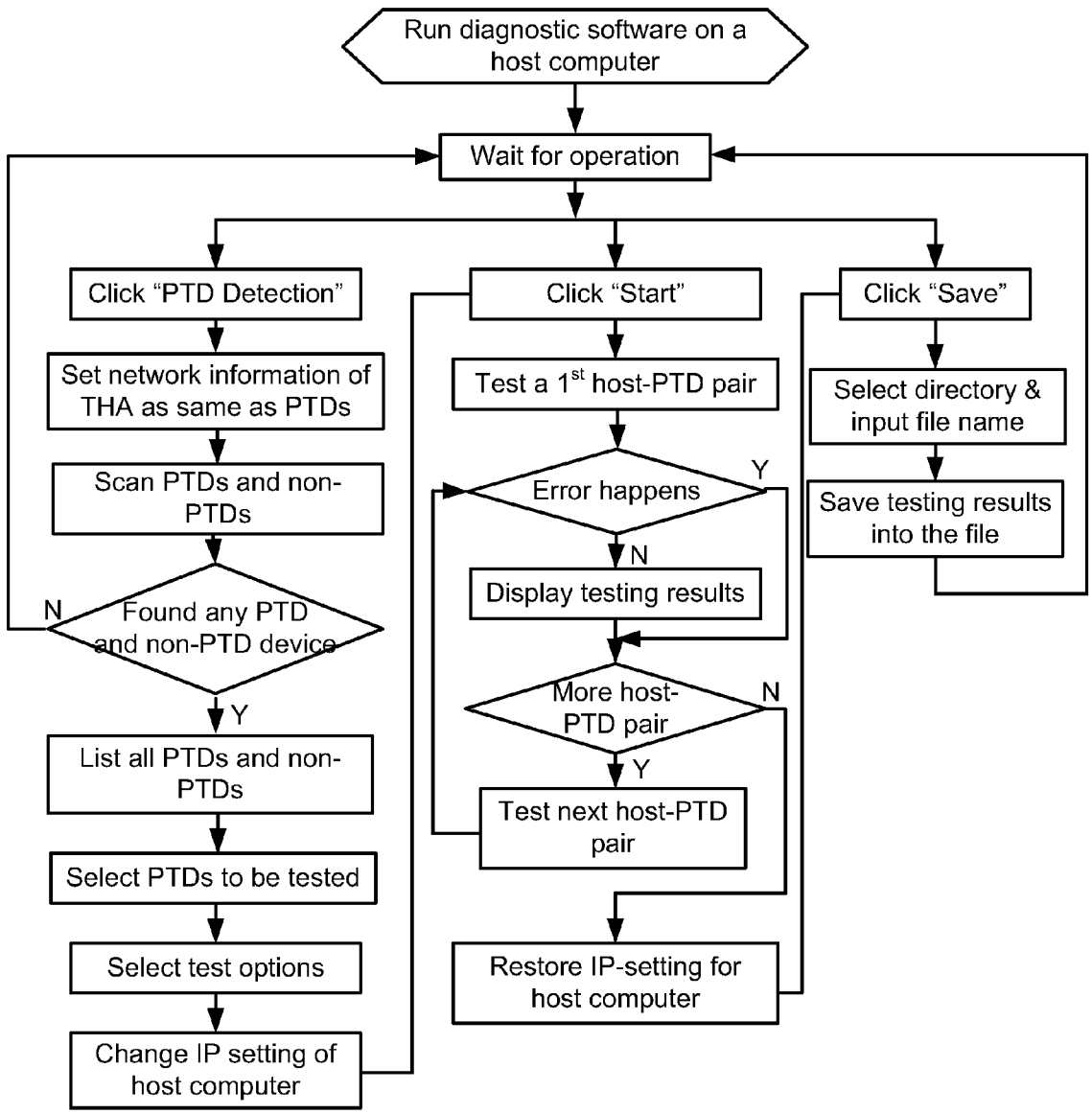
FIG. 5 is an exemplary working flowchart of a network diagnostic software according to an embodiment of the present invention.

FIG. 5 is an exemplary working flowchart of a network diagnostic software according to an embodiment of the present invention. This diagram is merely an example, which should not unduly limit the scope of the claims. One of ordinary skill in the art would recognize many variations, modifications, and alternatives. As shown, the working flow 500 of a network diagnostic software is an example of applying the PNT software utility module loaded on a host computer for diagnose a powerline network. In a specific embodiment, the host computer should be connected to a THA that is plugged into the same powerline network where a powerline test apparatus (i.e. a PTD) is plugged in to execute the corresponding testing functions. The working flow of the network diagnostic software can be followed to support a series of testings with multiple host-PTD pairs. For example, testings of a powerline network involving a host operated under Microsoft Windows OS including Win 98, 2000, ME, XP, Vista and 6 PTDs are supported. In one example, the testing configuration is the same as shown in FIG. 3 with host computer 303 using the testing method 400. In another example, testings involving a host and maximum 32 or 64 PTDs can be supported following the working flow 500 of the network diagnostic software. In one embodiment, the network diagnostic software is capable of selecting the PTDs to run the test against. In another embodiment, the network diagnostic software is capable of running each test for individual PTD or multiple tests for a plurality of PTDs sequentially. More descriptions about the testing software operation setup, interface configuration, and protocol can be found throughout the specification and specifically in more details in following paragraphs.

As shown in FIG. 5, when the network diagnostic software is loaded on a host computer (that has been connected into the network through a THA), it will run in a loop to await operation from user. The operations supported by the software include: Scan PTDs, Start a testing, Stop of current testing, Save the latest testing results, Name PTDs, Set LED threshold and Exit, and more.

In a specific embodiment, the Scan PTDs function is executed via a "PTD Detection" operation which enables automatic search of all powerline test apparatus in the PLC network and identification of all discovered PTDs by serial number in a list. The information associated with each of devices in the list includes Layer2 information including MAC address, device name, MAC firmware version an build date, and QoS setting on the device; as well as Layer3 information including IP address (or indicate of a non-IP device), Display the IP addresses of the PTD, type of device, and OS firmware version and build date. A checkbox is available next to each test node for selecting which PTD to include in the test. Non-PTD devices can be also detected through a Scan non-PTD operation. The non-PTD devices also include information of MAC address, link speed, MAC firmware version, and QoS. Finally both PTDs and non-PTD devices will be included in a list for the user to select one PTD for testing. Once a PTD is selected, the software client needs to set IP address on the host computer so that it is in the same IP Subnet (IP address is released to the MAC address) as the selected PTD at one node. It also needs to reverse or restore this IP setting when the software is shut down.

In another specific embodiment, the "Start" operation is only enabled when at least one PTD has been detected during above PTD detection procedure. The "Stop" operation is only enabled when the test has been started. When the "Stop" screen button is clicked, a message window will pop up for confirmation. If user selected "Yes," the current test will be stopped. If no error occurs, testing results will be displayed on the testing computer. Inquiry for more PTD tests is popped up and the test for next PTD can begin. Again IP setting needs to be restored in the testing computer for current PTD to be tested. Once the testing is finished, the test results can be saved into the file located in the corresponding folder of the testing computer. The "Save" operation is only enabled when a testing has been completed. When the operation is issued, a window pops up for directory selection and file name input.

In yet another specific embodiment, other operations of the diagnostic software can be performed. For example, the "Name PTD" operation can name more than one PTD. User needs to select the PTDs to be named first, then input new name for each selected PTD. All PTD names are saved in the PTDs locally. The "Change LED" operation is used to change LED throughput threshold for each selected PTD. The "Exit" operation is sued to exit and close the software. When a test is in process, it cannot exit/close the software.

The diagnostic software is running on the testing computer with Microsoft Windows OS and is used to detect and configure PTD before each testing. Once a PTD device is detected and configured, the diagnostic software will generate TCP/UDP testing traffic to the PTD and calculate network statistics between the test original point host node and the PTD under testing or between any two PTDs. In one embodiment, the testing traffic includes PING, TCP, UDP operations and each test is run sequentially on multiple PTDs. For example, a test traffic includes performing PING roundtrips with configurable packet sizes. In another example, the testing traffic includes performing TCP throughput test with configurable packet sizes and amount of data to push through the corresponding powerline network. In yet another example, the testing traffic includes performing UDP throughput test with configurable packet sizes, throughput load, and amount of data to push through the corresponding powerline network. In an alternative embodiment, the test can be run in parallel with multiple PTDs.

In one embodiment, a GUI interface of the diagnostic software is used for user to input test operation instructions and output testing results. For example, the testing results may include: TCP upload throughput/rate, TCP download throughput/rate, TCP bi-directional throughput/rate, TCP upload packet loss (with specified bandwidth), UDP upload delay jitter (with specified bandwidth), UDP download packet loss (with specified bandwidth), UDP download delay jitter (with specified bandwidth), UDP bi-directional packet loss (with specified bandwidth), UDP bi-directional delay jitter (with specified bandwidth), Ping average response time, minimum response time, maximum response time, and packet loss percentage.

Figure 6A:
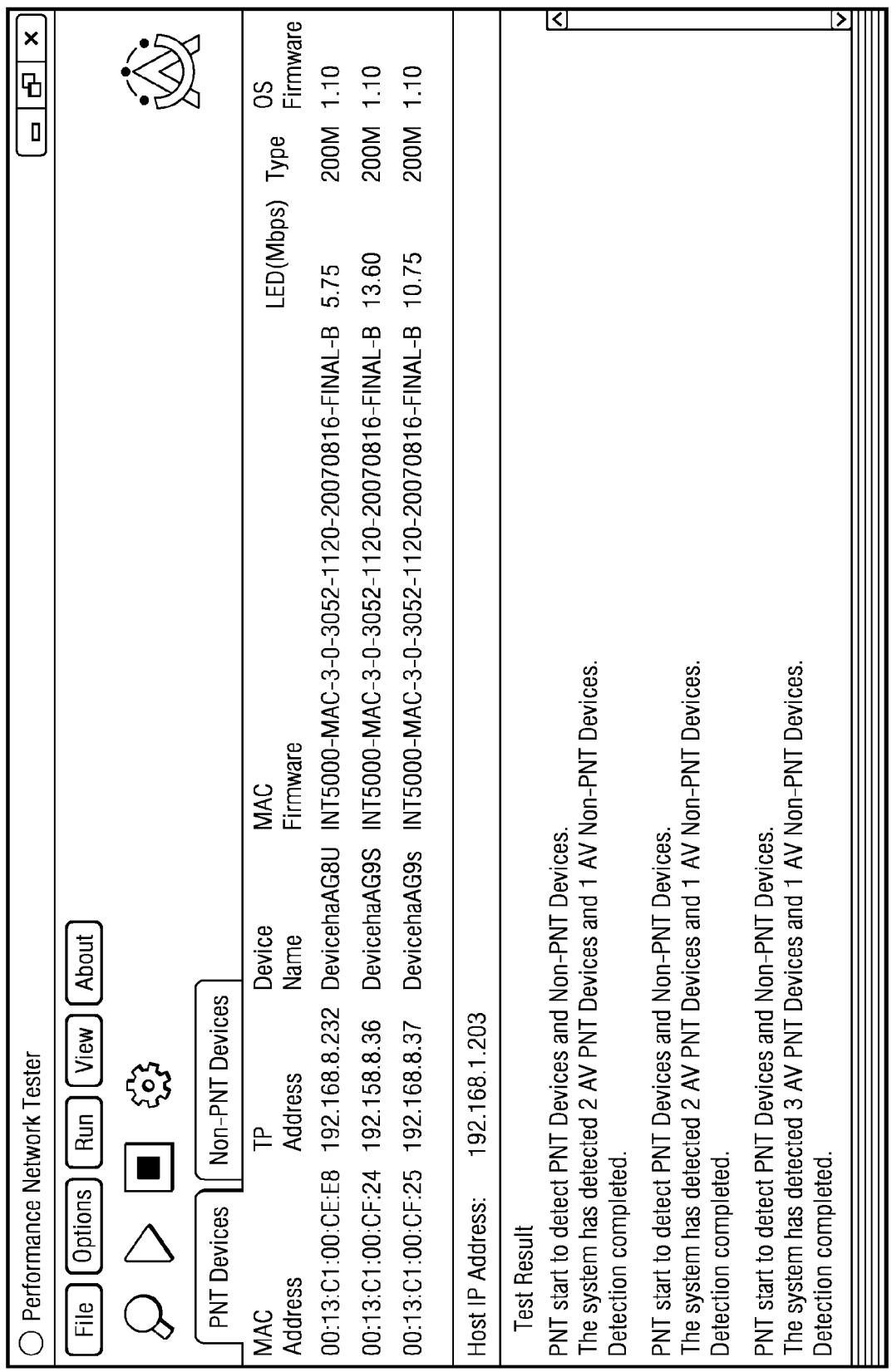

FIG. 6A is an exemplary screen display of a GUI interface of a performance network tester (PNT) software utility according to an embodiment of the present invention. This diagram is merely an example, which should not unduly limit the scope of the claims. One of ordinary skill in the art would recognize many variations, modifications, and alternatives. As shown, scanned results of PNT devices and Non-PNT devices are listed including device's MAC Address, IP Address, Device Name, etc. The host IP Address is also listed. From this level of the GUI interface shown in FIG. 6A, further PNT settings can be selected and performed. FIG. 6B is another exemplary screen display of the GUI interface of the PNT software utility according to the embodiment of the present invention. As shown, one PNT device is selected (as indicated by a check make in a box under MAC Address. Additionally, Testing from end to end between the pairs of PNT devices can be determined at this level. The pairs can be a host and the selected PNT device such as a PTD plugged in one node of the powerline network.

Figure 6C:
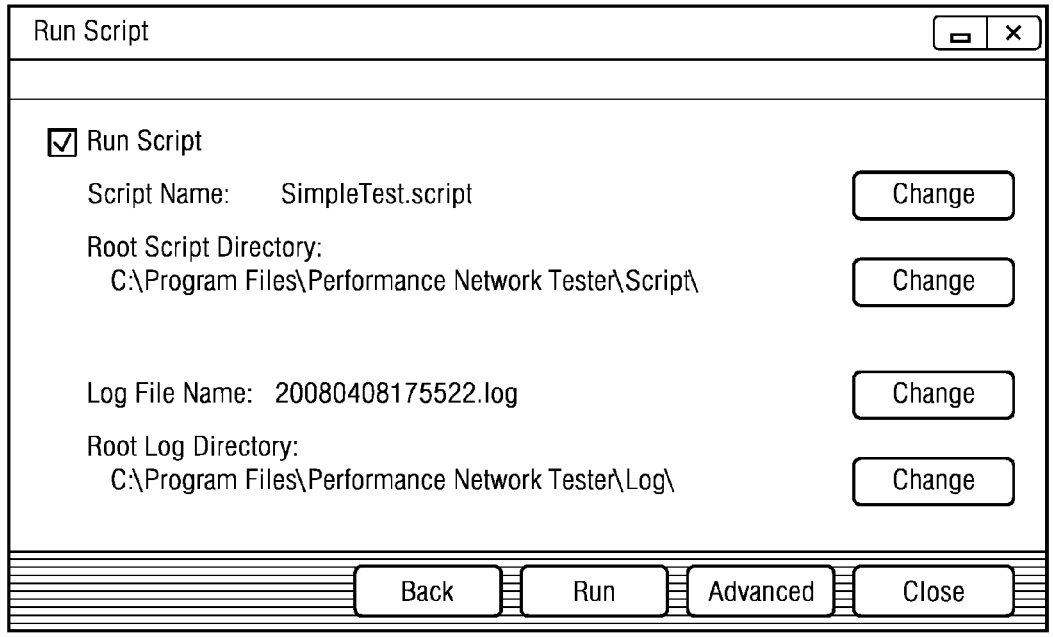
Figure 6D:
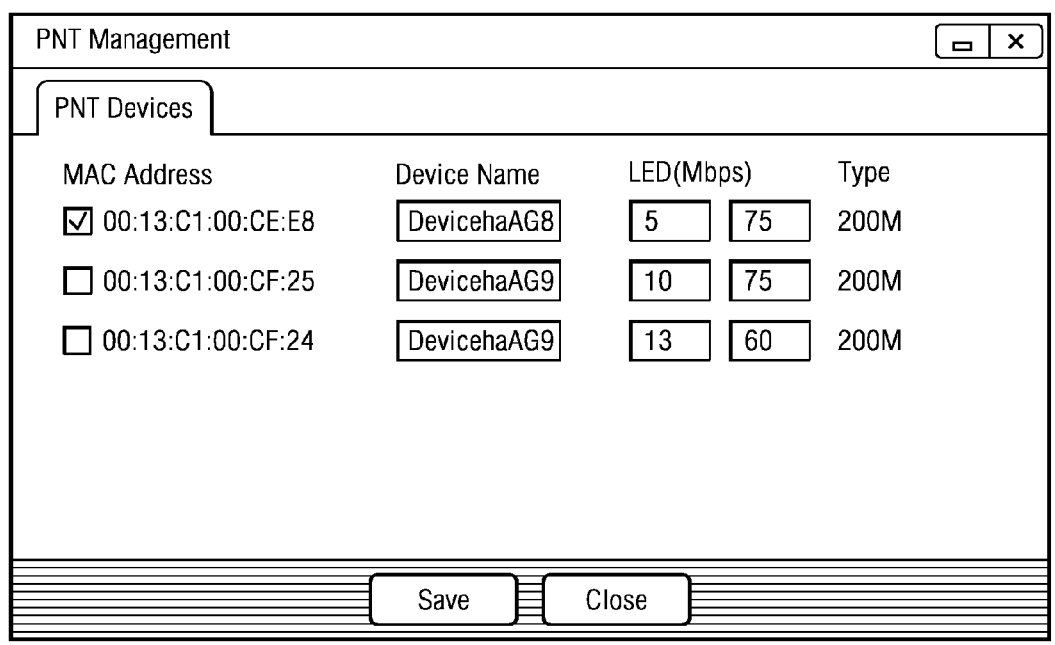
Figure 6E:
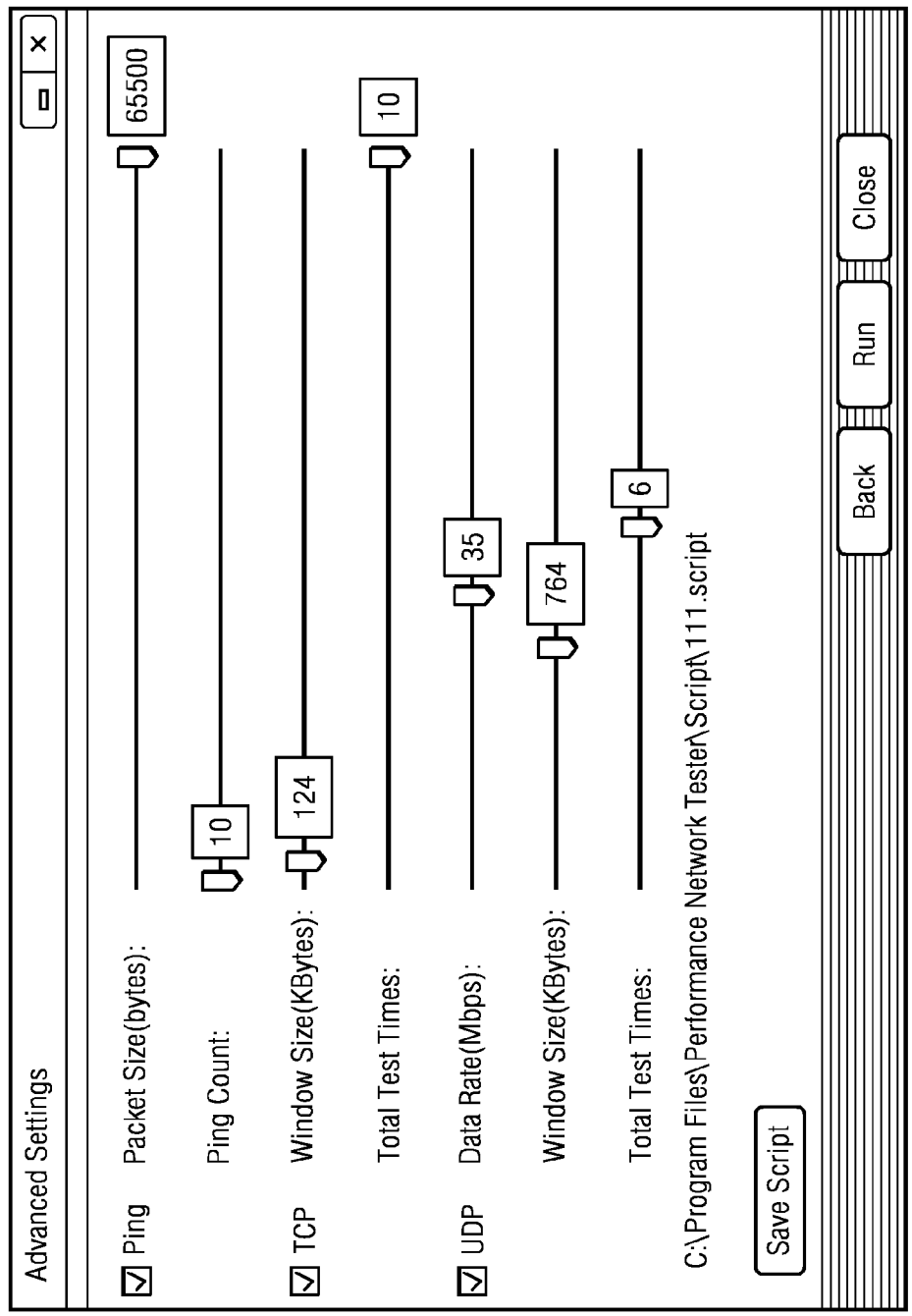

FIG. 6C is yet another exemplary screen display of the GUI interface of the PNT software utility according to the embodiment of the present invention. As shown, testing script is run under this level. Here, a specific test option is executed to load pre-programmed script file from the host computer. Also, a log file is opened for the purpose of saving the corresponding testing results. FIG. 6D is yet another exemplary screen display of the GUI interface of the PNT software utility according to the embodiment of the present invention. As shown, the PNT device management can be visually displayed for user to give instruction or made adjustment accordingly. The PNT device management tool includes selecting the PNT device by checking in the box under MAC Address, displaying Device Name, LED Threshold and Type. FIG. 6E is yet still another exemplary screen display of the GUI interface of the PNT software utility according to the embodiment of the present invention. As shown, advanced settings of several testing options are displayed. User can make selection of the testing parameters including PING operation and initiation of TCP or UDP data packets. As an example, the length of a PTD Name can be selected from 0 to 12; the range of PTD LED Threshold is from 5 to 75 Mbps (The LED threshold is used to indicates PHY rate throughput between the PTD and the THA by different color); the size of packet size for PING is from 32 to 65500 Bytes; the PING count is from 10 to 100; the Window size for TCP/UDP testing is from 64 to 2048 Kbytes; the total test times for TCP/UDP testing is from 3 to 10; the UDP specified bandwidth is from 20 to 70 Mbps. As shown, a status bar in the GUI interface can be used to adjust testing settings.

In one embodiment, the PNT software utility includes a PNT protocol used for the powerline networking testing. The PNT protocol defines communication command settings between a management software and a client device. The protocols include following, but not limited to, commands: PTD Discover, PTD Report Information, Start Testing Request/Confirm, Stop Testing Request/Confirm, Testing Status Query/Report, Set LED Threshold Request/Confirm, and Report PTD Request/Confirm.

FIG. 7A is an exemplary protocol command format according to an embodiment of the present invention. This diagram is merely an example, which should not unduly limit the scope of the claims. One of ordinary skill in the art would recognize many variations, modifications, and alternatives. As shown, all of data is binary format and all commands use Layer-2 protocol. The Ethernet packet type is 0x9011. The command format includes at least information of destination MAC address, source MAC address, type of Ethernet packet, device type, type of message to describe the command, length of data field, content of data message, and check sum for data filed. Here the destination address and source address plus packet type form a header of Layer2 data packet. In one example, either the first data signal and the second data signal initiated from the PLC module of a powerline test apparatus or a PTD described in earlier paragraphs has its data packet in a way defined above.

Additionally, FIGS. 7B-7J are diagrams illustrating corresponding command details according to certain embodiments of the present invention. These diagrams are merely examples, which should not unduly limit the scope of the claims. One of ordinary skill in the art would recognize many variations, modifications, and alternatives. As shown in FIG. 7B, a command "PTD Discovery" has its detail being illustrated following the format defined in FIG. 7A. PTD Discovery command is used to discover all PTDs in the same powerline logical network from a test host. The test host is located within the testing computer. Typically, this command is sent to individual PTD on the target node after initiated by the test host.

FIG. 7C shows another command: PTD Report Information. This command sends response for previous command PTD Discovery from a PTD to the test host. FIG. 7D shows another two commands: Start Testing Request and Start Testing Confirm. Firstly, the command "Start Testing Request" is used to send a command to start a specification testing for a specified PTD. Secondly, the command "Start Testing Confirm" is used to send a response to test host from the specified PTD to tell a testing has been started successfully or not following the execution of the previous command.

FIG. 7E shows another two commands: Stop Testing Request and Stop Testing Confirm. Firstly, the command "Stop Testing Request" is used to send a command to stop a specification testing for a specified PTD. Secondly, the command "Stop Testing Confirm" is used to send a response to test host from a specified PTD to tell that a testing has been stopped successfully or not following the execution of the previous command.

FIG. 7F shows another two commands: Auto Testing Request and Auto Testing Confirm. Firstly, the command "Auto Testing Request" is used to send a command to start an automatic specification testing for a specified PTD. Within the command setting, the packet size and testing type are predefined. For example, as shown in FIG. 7F the packet size is 2 bytes and three test types are included: PING, TCP and UDP. Secondly, the command "Auto Testing Confirm" is used to send a response to test host from the specified PTD to tell a testing is started successfully or not following the execution of the previous command.

FIG. 7G shows another two commands: Testing Report Request and Testing Report Confirm. Firstly, the command "Test Report Request" is used to ask for a report information from the specific PTD to the PNT software utility. Secondly the command "Test Report Confirm" is used to send a response to the PTD to tell a report successfully or not following the execution of the previous command.

FIG. 7H shows another two commands: Testing Status Request Query and Testing Status Report. Firstly, the command "Test Status Request Query" is used to send a command to query a testing status for a specified PTD. Secondly, the command "Status Testing Report" is used to send a response/report to test host from the specified PTD to tell the testing status.

FIG. 7I shows another two commands: Set PTD Attribute Request and Set PTD Attribute Confirm. Firstly, the command "Set PTD Attribute Request" is used to change PTD attribute for a specified PTD. Secondly, the command "Set PTD Attribute Confirm" is used to send a response to test host from a specified PTD to confirm the PTD Attribute setting.

FIG. 7J shows yet another two commands: Reboot PTD Request and Reboot PTD Confirm. Firstly, the command "Reboot PTD Request" is used to reboot a specified PTD. Secondly, the command "Reboot PTD Confirm" is used to send a response to test host from a specified PTD to confirm the PTD reboot request.

Figure 8:
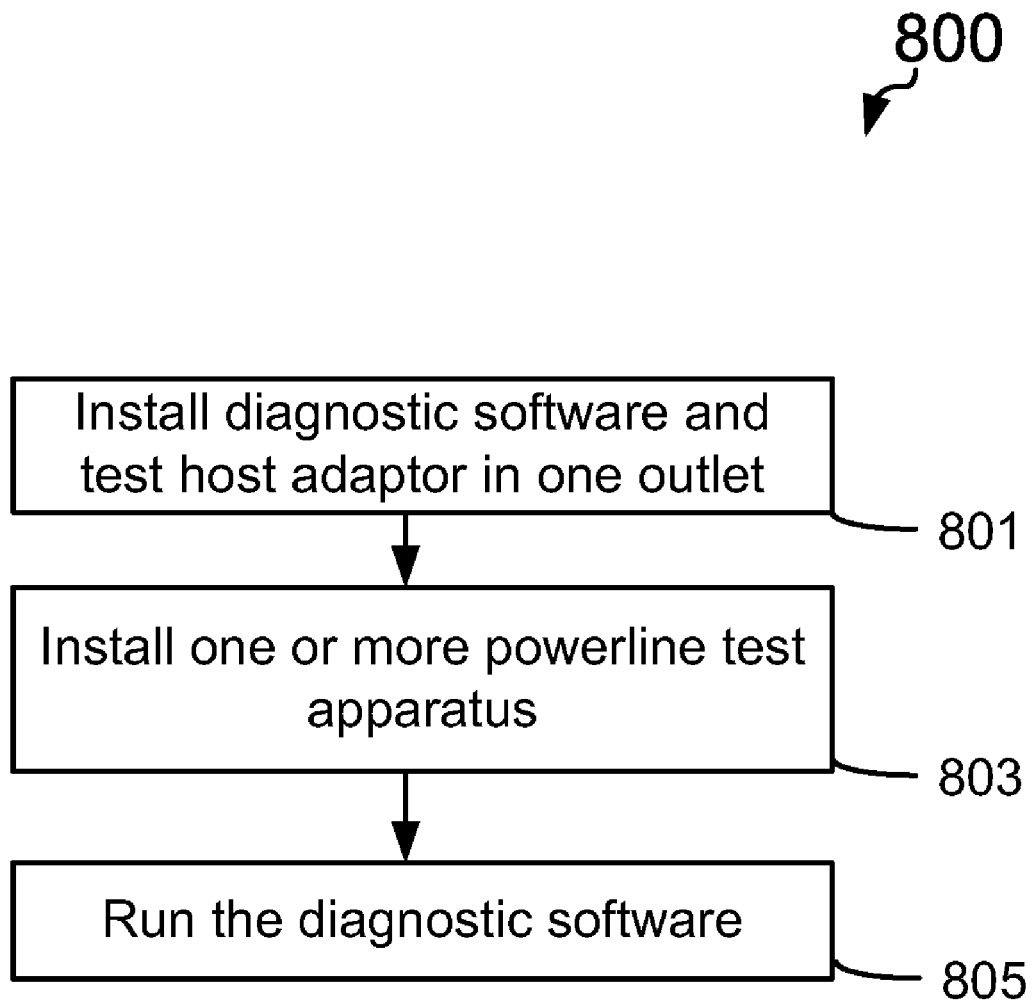
FIG. 8 is a flow chart illustrating a method to install the powerline test apparatus in the powerline network environment according to a specific embodiment of present invention.

FIG. 8 is a flow chart illustrating a method to install the powerline test apparatus in the powerline network environment according to a specific embodiment of present invention. This diagram is merely an example, which should not unduly limit the scope of the claims. One of ordinary skill in the art would recognize many variations, modifications, and alternatives. As shown, the method 800 includes a process 801: Install a diagnostic software and a test host device with AV adaptor, associated with a section of powerline network that requires a performance network testing. First of all, the process includes installing the Performance Network Tester (PNT) diagnostic software utility into a (host) computer running a Windows 2000, XP, or Vista from Microsoft Corporation of Redmond, Wash. or other suitable operating system. Secondly, the process includes attaching (or plugging in through a pair of prongs) the test host device with AV adaptor into an electrical/power outlet within a specified section of powerline network. This outlet thus become a host node of any pair of end-to-end network nodes in which a diagnostic characterization is required. In other example, this electrical/power outlet is referred to be a Master Pathway outlet. Finally, the process includes connecting an Ethernet cable from the test host device to the computer that is ready for performing the testing for the section of powerline network.

Additionally, the method 800 includes a process 803: Install a powerline test apparatus. In one example, one or more PNT Devices (PTD) is plugged into corresponding one or more electrical/power outlets. The one or more electrical/power outlets thus become target nodes to be paired with the host node. In other example, these outlets are referred to as Device Pathway outlets. In particular, the process includes installing the one or more PTDs to those outlets requiring communication characterization to/from the Master Pathway outlet.

Further, the method 800 includes a process 805: Run the PNT diagnostic software utility from the host computer. Firstly of all, the process 805 includes starting the PNT diagnostic software utility at the host computer, from which a pop-up GUI window with all available host network interface card (NIC) devices appear. Secondly, the process 805 includes selecting the NIC connected to the Master Pathway and click an "Apply" button in the pop-up window. A graphical user interface appears. Thirdly, the process 805 includes scanning for all the PTDs available on the section of powerline network. A list of devices appear in view window of the software. In one embodiment, users can identify each device detected by corresponding specialized PTD Name. All device's PTD Names are saved on the local host drive with binding information, including the device's MAC address. The length of PTD Name is limited to 0 to 12 characters. Space may not be used according to a specific embodiment. In another embodiment, user can change various threshold settings of Throughput LEDs for each detected device. Throughput LEDs are supported by custom firmware provided by Intellon Corporation. The software only provides an interface to change the thresholds.

Furthermore, the process 805 includes selecting the PTDs requiring the testing. In one embodiment, this process includes configuring Ping "Packet Size" from 32 to 65500 bytes, configuring "Ping Count" from 3 to 30 unique events, and configuring "UDP Specification Bandwidth" from 5 to 70 Mbps.

Moreover, the process 805 includes selecting all protocol tests and accompanying parameters that apply for each device pathway requiring validation. As a user clicks "Start" to start the diagnostic tests, each device pathway's results will appear in the "Test Result(s)" field of the software interface. Then click "Chart" to view test graphic chart of test result if one test had been done and click the "Save" button to save test results to a file.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A powerline signal test apparatus comprising:
a housing;
a pair of prongs protruding from the housing, the pair of prongs including a first prong and a second prong to be inserted respectively into an AC powerline outlet;
a powerline module coupled to the pair of prongs and within an interior region of the housing, the powerline module being configured to process a first data signal in a first format;
a processor coupled to the powerline module and provided within the interior region of the housing, the processor being configured to initiate transfer of first test data characterized by a first data rate from the pair of prongs through a portion of a powerline network to a target node, the processor being configured to initiate receipt of second test data from the target node characterized by a second data rate, wherein the second test data is an acknowledgement to the first test data;
a signal strength indication for the portion of the powerline network associated with the second test data characterized by the second data rate;
an output device coupled to the processor, the output device configured to output the signal strength indication.

2. The apparatus of claim 1 wherein the housing has a width of less than six inches and a length of less than ten inches.

3. The apparatus of claim 1 wherein the output device comprises an LCD display, the LCD display comprising a graphical representation of the signal strength indication.

4. The apparatus of claim 1 wherein the first data rate is at least 14 MB per second, 85 MB per second, 200 MB per second, 400 MB per second, or 1000 MB per second.

5. The apparatus of claim 1 wherein the second data rate is less than the first data rate.

6. The apparatus of claim 1 further comprising a data port coupled to the housing, the data port being coupled to a computing device, the computing device comprising a display, a central processor, a volatile memory, and a data bus, the data bus coupled to the data port, the computing device configured to output a graphical representation of the signal strength indication.

7. The apparatus of claim 6 wherein the data port comprises an 10/100 RJ-45 type Ethernet port, or a USB port.

8. The apparatus of claim 1 wherein the housing comprises a molded plastic material to enclose the powerline module and processor, the molded plastic material having an exterior region, the exterior region comprising the output device, which comprises an LCD display or one or more LED devices, the LCD display or one or more LED devices being coupled to the processor via a driver coupled between the LCD display or one or more LED devices and the processor.

9. The apparatus of claim 1 further comprising a software utility module, the software utility module being configured to instruct the initiation of the transfer of the first test data characterized by the first data rate.

10. The apparatus of claim 1 further comprising a software utility module, the software utility module being configured to instruct the initiation of the transfer of the first test data characterized by the first data rate and being configured to instruct the initiation of the receipt of the second test data.

11. A method for determining signal strength of a powerline network, the method comprising:
providing a powerline test apparatus, the powerline test apparatus comprising: a housing;
a pair of prongs protruding from the housing, the pair of prongs including a first prong and a second prong to be inserted respectively into an AC powerline outlet;
a powerline module coupled to the pair of prongs and within an interior region of the housing, the powerline module being configured to process a first data signal in a first format;

a processor coupled to the powerline module and provided within the interior region of the housing, the processor being configured to initiate transfer of first test data characterized by a first data rate from the pair of prongs through a portion of a powerline network to a target node, the processor being configured to initiate receipt of second test data from the target node characterized by a second data rate;

a signal strength indication for the portion of the powerline network associated with the second test data characterized by the second data rate;

an output device coupled to the processor, the output device configured to output the signal strength indication; and inserting the pair of prongs into the AC powerline outlet coupled to a segment of the powerline network, the powerline network being coupled to a powerline data source;

transferring the first test data characterized by the first data rate through the pair of prongs;

receiving one or more portions of the first test data at the target node through the portion of the powerline network;

processing one or more portions of the first test data to derive the second test data;

deriving the signal strength indication for the portion of the powerline network associated with the second test data characterized by the second data rate; and outputting the signal strength indication using the output device.

12. The method of claim 11 wherein the housing has a width of less than six inches and a length of less than ten inches.

13. The method of claim 11 wherein the output device comprises an LCD display, the LCD display comprising a graphical representation of the signal strength indication.

14. The method of claim 11 wherein the first data rate is at least 200 MB per second, 400 MB per second, or 1000 MB per second.

15. The method of claim 11 wherein the second data rate is less than the first data rate.

16. The method of claim 11 further comprising outputting the signal strength indication using a data output port coupled to the housing.

17. The method of claim 11 further comprising outputting the signal strength indication using a data port, the data port being coupled to a computing device, the computing device comprising a display, a central processor, a volatile memory, and a data bus, the data bus coupled to the data port, the computing device configured to output a graphical representation of the signal strength indication.

18. The method of claim 11 wherein the housing comprises a molded plastic material to enclose the powerline module and processor, the molded plastic material having an exterior region, the exterior region comprising the output device, which comprises an LCD display or one or more LED devices, the LCD display or one or more LED devices being coupled to the processor via a driver coupled between the LCD display or one or more LED devices and the processor.

19. The method of claim 11 further comprising initiating a software utility module to instruct transferring of the first test data characterized by the first data rate.

20. The method of claim 11 further comprising initiating a software utility module to instruct transferring of the first test data characterized by the first data rate and instructing the initiation of the receipt of the second test data through the portion of the powerline network.

* * * * *